United States Patent [19]

Vollhardt

[11] 4,314,826

[45] Feb. 9, 1982

[54] COAL GASIFICATION APPARATUS

[75] Inventor: Frohmut Vollhardt, Siegen-Bürbach, Fed. Rep. of Germany

[73] Assignee: M.A.N. Maschinenfabrik Augsburg-Nürnberg Aktiengesellschaft, Fed. Rep. of Germany

[21] Appl. No.: 178,902

[22] Filed: Aug. 18, 1980

[30] Foreign Application Priority Data

Aug. 18, 1979 [DE] Fed. Rep. of Germany ....... 2933514

[51] Int. Cl.³ ............................. C10J 3/48; C10J 3/52
[52] U.S. Cl. .......................................... 48/77; 48/67; 48/69; 15/316 R; 55/269; 122/32; 122/392; 134/105; 134/166 R
[58] Field of Search ................... 48/67, 69, 77; 122/5, 122/7 R, 32, 379, 392, 6 A; 15/316 R; 134/105, 166, 171; 55/269

[56] References Cited

U.S. PATENT DOCUMENTS

| | | | |
|---|---|---|---|
| 2,660,155 | 11/1953 | Chapman | 122/6 A |
| 2,775,958 | 1/1957 | Kolling | 122/392 |
| 3,276,437 | 10/1966 | Jonakin et al. | 122/392 |
| 4,204,296 | 5/1980 | Reilly | 15/316 R |

FOREIGN PATENT DOCUMENTS 2705558 8/1978 Fed. Rep. of Germany .......... 48/77

*Primary Examiner*—Peter F. Kratz
*Attorney, Agent, or Firm*—Toren, McGeady & Stanger

[57] ABSTRACT

In a device for the treatment of synthesis gas produced by coal gasification, a vertically extending shell is connected to a coal gasification reactor so that the interior of the shell is in direct communication with the interior of the reactor. The interior surface of the shell is lined with upwardly extending heat exchange tubes. Additional heat exchange tubes in combination with the tubes lining the shell form a plurality of upwardly extending chambers projecting radially inwardly from and spaced angularly apart about the tube lining. Tubes coextensive with the heat exchanger tubes forming the lining, are located within the chamber for conveying a cleaning fluid. The tubes are arranged to direct the cleaning fluid approximately tangentially of the heat exchanger tubes lining the shell for cleaning the exterior surfaces of such tubes.

10 Claims, 3 Drawing Figures

COAL GASIFICATION APPARATUS

SUMMARY OF THE INVENTION

The present invention is directed to a device forming a gas distribution space for the treatment of synthesis gas produced by coal gasification. The gas distribution space is in communication with the interior of the reactor and operates under approximately the same internal pressure. The surface defining the gas distribution space is lined with heat exchanger tubes arranged next to one another.

In German Offenlegungsschrift No. 26 50 512 a device of this general type for the purification of the synthesis gas produced by chemical coal gasification is disclosed. In such a device, the gas components, particularly soot and dust which tend to flow freely, deposit on the heat exchanger tubes and, as a result, severely impair heat transmission from the hot gas stream to the medium in the heat exchanger tubes. Many devices and processes are known for cleaning the outside surfaces of the tubes, however, they have the disadvantages of involving a too complicated construction, of requiring an interruption in operation of the device, or, if used while the device is being operated, of not being effective especially at the high temperatures of approximately 1400° C. which exist in the synthesis gas exiting from a coal gasification reactor. Furthermore, the pressure within the gas distribution space connected to the reactor must be taken into consideration and such pressure is approximately 50 bar.

Therefore, it is the primary object of the present invention to provide a device of the type described above in which, during operation at the specified temperature and pressure in the gas distribution space, a cleaning of the exterior surfaces of the heat exchanger tubes can be accomplished without causing a reduction in the heat exchange as has been the case in known devices.

In accordance with the present invention, the device includes a shell having heat exchanger tubes lining the interior of the shell forming a cylindrically shaped lining. Additional heat exchanger tubes in combination with those lining the shell form upwardly extending and radially inwardly projecting chambers. These chambers extend approximately for the length of the heat exchanger tubes lining the shell. A gaseous or liquid cleaning medium is conducted through the chambers at a higher pressure than the pressure in the gas distribution space. The cleaning medium is directed tangentially or approximately tangentially over the tubes lining the shell adjacent to the chambers.

In one embodiment of the invention, two to six such chambers of approximately rhomboidal or semi-circular cross section are arranged projecting inwardly from the tubes lining the shell. The walls projecting inwardly from the lining have openings through which the cleaning medium can be directed against the tubes. Preferably, the chambers are in communication with the gas distribution space and are bounded on all sides by the heat exchanger tubes. Tubes are located within the chambers adjacent the walls projecting inwardly from the lining through which the cleaning medium is passed. Accordingly, the same pressure exists within the chambers as in the gas distribution space, however, the temperature within the chamber is lower than that in the gas distribution space.

In accordance with another feature of the invention, the tubes conducting the cleaning medium open from one or more ring conduits.

If the device has one or more laterally extending gas discharge lines, such as shown in German Offenlegungsschrift No. 26 50 512, then it is preferable if a part of the heat exchanger tubes lining the shell are bent radially inwardly in the lower half of the shell for forming an annular gas outlet space in the region of the gas discharge lines. Accordingly, the combination of the inwardly bent heat exchanger tubes and the radially inner walls of the chambers form a tubular ring to which the gas discharge lines are connected. At their lower ends, the chambers and the gas outlet spaces created by the inwardly bent heat exchanger tubes are connected with the interior of the gas distribution space.

Another feature of the invention involves the use of finned tubes or tubes joined by webs for forming the tubular lining of the inner surface of the shell. Such tube arrangements are known and openings in the heat exchanger walls formed by such tubes can be provided by openings in the fins or the webs.

A particular advantage of the device embodying the present invention is the ability to maintain the size of the heat exchanger surfaces and with simple means to clean the surfaces of the tubes while the device is in operation. Blower devices for the removal of soot and dust are known. The advantage gained by the present invention is that the cleaning medium does not cool or only insignificantly cools the hot gas stream in the device and the heat from the gas stream can be effectively transmitted to the heat exchanger tubes. Moreover, the elements which distribute the cleaning medium do not require any insulating means and the entire length of the heat exchanger tubes can be cleaned uniformly and simultaneously.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
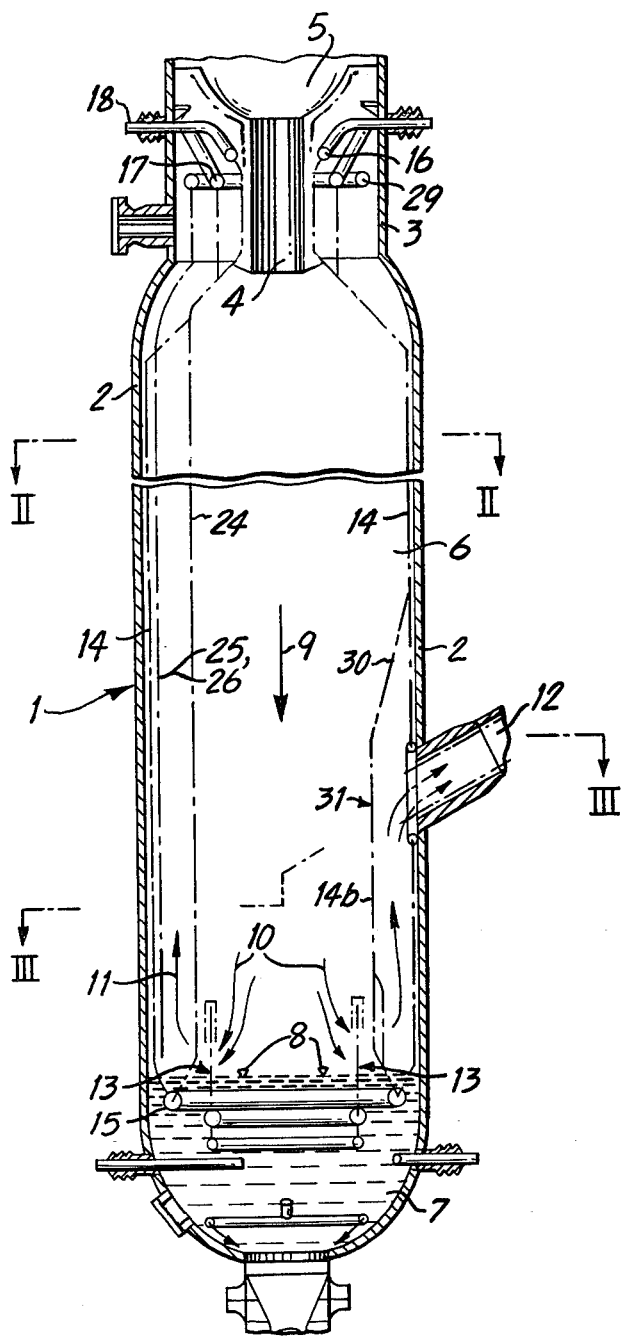
FIG. 1 is a schematic vertical sectional view of a device embodying the present invention.

In FIG. 1 a device 1 is shown for treating synthesis gas produced in a coal gasification reactor and includes an upwardly extending outer shell 2 joined by a reduced diameter upper section 3 to a part 5 of the reactor. A connecting line 4 joins the part 5 of the reactor with the gas distribution space 6 within the shell 2. Gas distribution space 6 is located within the shell 2 and operates under a temperature of about 1400° C. and a pressure of approximately 50 bar which also prevail within the reactor part 5 with which the space 6 is in communication. A cooling medium bath 7 is located in the lower end of the gas distribution space and has a liquid level 8.

Figure 3:
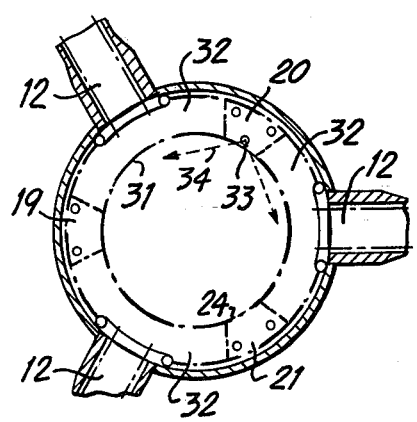
FIG. 3 is a sectional view taken along the line III—III in FIG. 1.

Components precipitated out of the gas stream within the gas distribution space drop to the cooling medium bath 7 and, if appropriate, solidify in the bath and then are removed. The gas stream flows downwardly from reactor part 5 through line 4 into the gas distribution space 6 in the direction of arrow 9. In the lower portion of the gas distribution space at about the liquid level 8, the gas stream reverses direction as shown by arrows 10 and 11 and flows upwardly to the gas discharge lines 12 located about midway between the upper and lower ends of the shell 2. As can be seen in FIG. 3, the gas discharge lines 12 project outwardly from the shell 2 and are approximately equiangularly spaced apart around the shell. Cooling elements 13 are located in the path of the gas stream as it reverses direction in the lower end of the gas distribution space 6 as indicated by the arrows 10.

Heat exchanger tubes 14 line the inner surface of the shell 2 forming a cylindrically shaped inner wall with either finned tubes or tubes joined by webs being used as the heat exchanger tubes. The tubes 14 are arranged in parallel relation extending upwardly over the inside surface of the shell 2 so that these tubes form a closed tubular jacket. At their lower ends, tubes 14 open into a ring conduit 15 located in the cooling medium bath 7. The heat exchanger medium is supplied by a line, not shown, into the ring conduit. From the ring conduit 15, the heat exchange medium rises upwardly in the heat exchanger tubes 14 with the medium forming steam collected in ring conduits 16,17 in the upper end of the shell 2 with the steam being removed from the ring conduit through lines 18.

Figure 2:
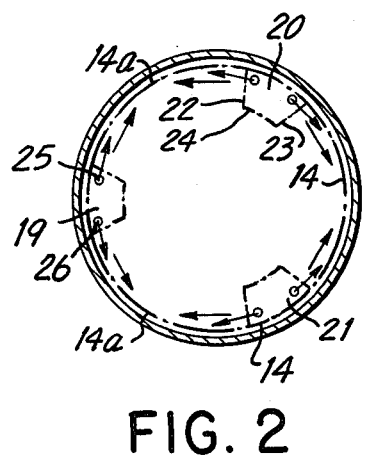
FIG. 2 is a sectional view taken along the line II—II in FIG. 1.

As illustrated in FIGS. 2 and 3, vertically extending chambers 19, 20, 21 extend radially inwardly from the tubular jacket formed by the heat exchanger tubes 14. The three chambers are equiangularly spaced apart at angles of 120° with respect to one another. As can be seen in FIG. 2, the chambers 19, 20 and 21 have a rhomboidal shape in section taken transversely of the vertical axis of the shell. The radially outer walls of these chambers are formed by heat exchanger tubes 14 as well as by tubes forming the generally radially inwardly projecting walls 22, 23 and the radially inner wall 24 extending transversely of the walls 22, 23. The lower ends of the tubes bounding the chambers 19, 20 and 21 also open into the ring conduit 15 and the heat exchange medium within these tubes is transformed into steam collected in the upper ring conduits 16, 17.

Walls 22, 23, 24 are also formed of finned tubes or tubes joined by webs. Small openings are provided in the webs or fins between the tubes so that within the chambers 19, 20, 21 a pressure prevails which is equal or approximately equal to the pressure in the gas distribution space. The temperature in the chambers, however, is a saturated steam temperature, considerably below the 1400° C. level present in the gas distribution space.

Within the upwardly extending chambers 19, 20, 21 in the vicinity of the intersection of the side walls 22, 23 with the radially outer walls formed by the heat exchanger tubes 14 lining the inner wall of the shell 2, are upwardly extending tubes 25,26 provided with nozzles directed tangentially or approximately tangentially to the adjoining sections 14a of the heat exchanger tubes. The nozzles are located in alignment with the small openings formed between the tubes forming the side walls 22, 23. A cleaning medium is supplied to the tubes 25, 26, such as a high-pressure steam, high-pressure water, nitrogen or another inert gas through line 29 located at the upper end of the shell 2. The cleaning medium flows out of the nozzles in tubes 25, 26 under a higher pressure than 50 bar, such as 80 to 120 bar, and cleans the heat exchanger tubes over their entire length, since the nozzles are uniformly distributed over the vertical height of the tubes 14.

As is shown in FIG. 3, the upwardly extending chambers 19, 20, 21 are equiangularly distributed between the gas discharge lines 12. As can be seen in FIGS. 1 and 3, between the radially inner walls 24 of the chambers 19, 20, 21, a portion of the heat exchanger tubes 14 commencing from the ring conduit 15 are bent inwardly into a common circular plane with the radially inner walls 24 creating a continuous inner wall 31.

Above the gas discharge outlets 12 the tubes forming the tubular wall 31 between the chambers 19, 20 and 21 are bent at 30 radially outwardly rejoining the tubes lining the inner surface of the shell 2. As can be seen in FIG. 1, while the chambers 19, 20 and 21 extend for approximately the full height of the shell 2, the tubular wall 31 extends up to just above the gas discharge outlets 12.

Just above the liquid level 8 of the cooling medium bath 7, the fins or webs between the tubes 14b forming the radially inner tubular wall 31 are omitted so that the gas stream passes between the tubes 14b from the lower end of the gas distribution space 6 into the spaces 32 from which the gas discharge outlets open. Accordingly, the gas stream flows along the path of the arrows 10 and 11 into the spaces 32 and then out through the discharge outlets 12. As is evident in FIG. 3, the tubular wall 31 is formed by the combination of the tubes 14b and the radially inner walls 24 of the chambers 19, 20 and 21 forming a largely closed annular surface.

The chambers 19, 20 and 21 are constructed so that an operator can climb up and down within the chambers. For providing the cleaning action for the tubes forming the tubular wall 31, in addition to the tubes 25, 26, tubes 33 are provided adjacent the radially inner walls 24 of the chambers 19, 20, 21 and these tubes are also provided with nozzles for guiding the cleaning medium in the direction of the arrows 34, note FIG. 3, for cleaning the exterior surfaces of the tubes in the tubular wall 31.

While specific embodiments of the invention have been shown and described in detail to illustrate the application of the inventive principles, it will be understood that the invention may be embodied otherwise without departing from such principles.

What is claimed is:

1. Apparatus including a coal gasification reactor and a device for the treatment of synthesis gas produced in the coal gasification reactor comprising a vertically extending shell forming a gas distribution space within said shell connected with the interior of the coal gasification reactor and operating under an internal pressure related to the pressure in the reactor, heat exchanger tubes located within said shell and including first heat exchanger tubes arranged along the inside wall of said shell, wherein the improvement comprises that said first heat exchanger tubes form a cylindrically shaped wall lining the interior of said shell and extend in the vertical direction of said shell, said heat exchanger tubes including second heat exchanger tubes coextensive with said first heat exchanger tubes and in combination therewith forming a plurality of upwardly extending individual chambers projecting radially inwardly toward and angularly spaced apart about the vertical axis of said cylindrically shaped wall and extending for substantially the vertical height of said heat exchanger tubes in said cylindrically shaped wall, means within said chambers for conducting a cleaning medium therethrough under a higher pressure than the pressure in said gas distribution space and said means being arranged for directing the cleaning medium approximately tangentially of said first heat exchanger tubes located between adjacent said chambers for cleaning the surfaces of said tubes.

2. Apparatus as set forth in claim 1, wherein said chambers have an approximately rhomboidal shape in section transverse to the vertical axis of said shell and said walls of said chambers adjacent said cylindrically shaped wall having openings therethrough through which the cleaning medium flows from said means over said first heat exchanger tubes.

3. Apparatus as set forth in claim 2, wherein said chambers having openings therein in communication with said gas distribution space within said shell, and said second heat exchanger tubes bounding said chambers radially inwardly of said cylindrically shaped wall, and said means for conducting a cleaning fluid comprising conduits located within said chambers with said conduits containing nozzles for directing the cleaning medium toward said first heat exchanger tubes.

4. Apparatus as set forth in claim 3, wherein at least one ring conduit located within said shell and arranged to distribute cleaning medium therefrom into said conduits in said chamber.

5. Apparatus as set forth in one of claims 1, 2, 3 or 4 wherein at least one gas discharge line is located in said shell and opens through said cylindrically shaped wall lining the interior of said shell, and said heat exchanger tubes including third heat exchanger tubes extending upwardly from the bottom of said shell spaced radially inwardly from said first heat exchanger tubes and extending upwardly to a level above said gas discharge line with said third exchanger tubes being bent radially outwardly above said gas discharge line and extending upwardly within said cylindrically shaped wall, said third heat exchanger tubes in combination with said second heat exchanger tubes forming said chambers and said first heat exchanger tubes forming said cylindrically shaped wall forming gas outlet spaces extending upwardly from the lower end of said shell with said gas discharge line communicating with said gas outlet spaces.

6. Apparatus as set forth in claim 5, wherein said second heat exchanger tubes defining the radially inner surface of said chambers and said third heat exchanger tubes forming a closed tubular wall spaced radially inwardly from said cylindrically shaped wall lining the inside surface of said shell.

7. Apparatus as set forth in claim 6, wherein openings being provided between said third heat exchanger tubes in the lower end of said gas outlet spaces for effecting communication between said gas outlet spaces and said gas distribution space.

8. Apparatus as set forth in claim 1, wherein said first, second and third heat exchanger tubes are finned tubes arranged to form a closure for the space between said tubes.

9. Apparatus as set forth in claim 1, wherein said first, second and third heat exchanger tubes comprise tubes with webs extending between and interconnecting said tubes.

10. Apparatus as set forth in claim 5, wherein said gas outlet spaces are arranged symmetrically between said chambers.

* * * * *